Figure 1:
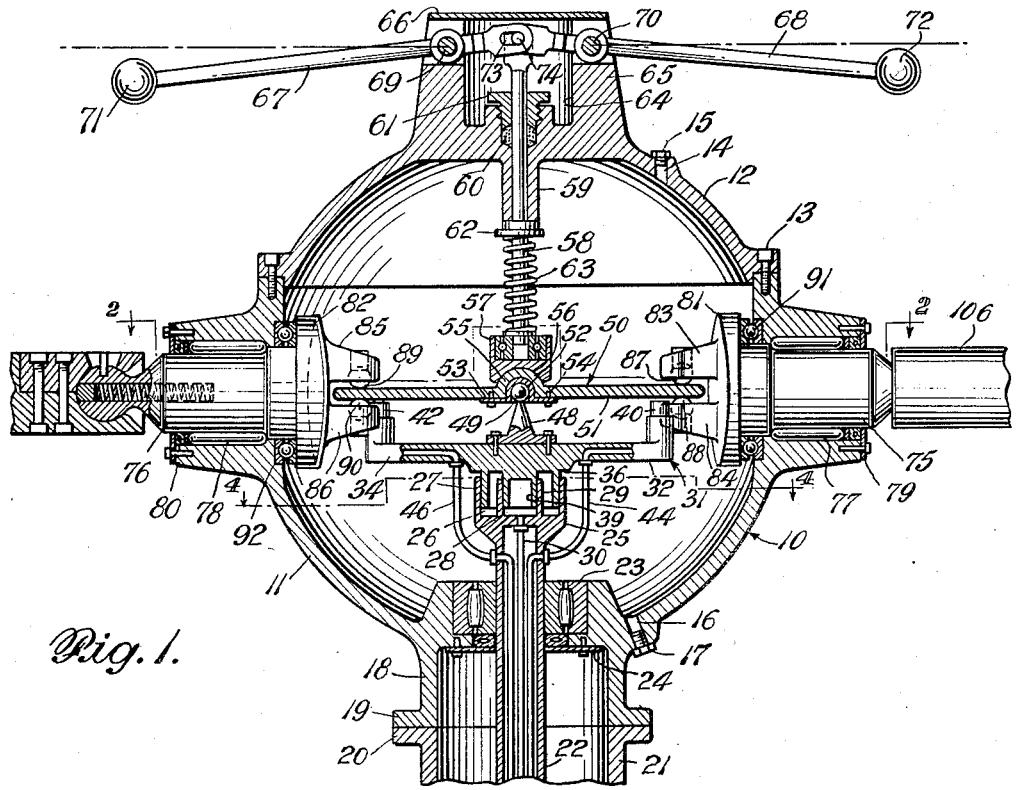

Jan. 5, 1960 W. B. HOOK 2,919,753
HELICOPTER ROTOR HEAD AND ROTOR CONTROL
Filed Nov. 26, 1956 3 Sheets-Sheet 1

INVENTOR
Wesley Byron Hook,

BY Jacoki & Jacoki
ATTORNEYS

Jan. 5, 1960 W. B. HOOK 2,919,753
HELICOPTER ROTOR HEAD AND ROTOR CONTROL
Filed Nov. 26, 1956 3 Sheets-Sheet 2

INVENTOR
Wesley Byron Hook,
BY Jacoki & Jacoki
ATTORNEYS

United States Patent Office 2,919,753
Patented Jan. 5, 1960

---

2,919,753

HELICOPTER ROTOR HEAD AND ROTOR CONTROL

Wesley Byron Hook, Fairfax, Va.

Application November 26, 1956, Serial No. 624,232

14 Claims. (Cl. 170—160.25)

This invention relates to aircraft of the rotary wing type commonly termed helicopters and more particularly to a helicopter rotor head and rotor control which may be utilized in present day helicopters to provide improved performance and maintenance characteristics.

Probably the most important part of present day helicopters is the rotor head and rotor control incorporated therein, since this head serves to support the rotor blades and to provide all lift for the aircraft, as well as mechanism to control the pitch of each blade which in turn serves to control the flight characteristics of the aircraft. Considerable trouble has been experienced with helicopter heads and rotor controls due to the complexity thereof and the fact that the same must withstand relatively great loads and a variety of stresses. Furthermore, these rotor heads and rotor control mechanism are located exteriorly of the aircraft in an exposed position and as a consequence, excessive wear and failure thereof has occurred, due to the collection of dirt or other foreign material and also due to freezing of the parts thereby preventing operation thereof during inclement weather. Furthermore, many of the parts of present day helicopter rotor heads and rotor controls are not enclosed and consequently, lubrication thereof is extremely difficult due to the fact there are many bearings and friction surfaces thereby requiring a relatively large number of lubrication points and this factor, in addition to those enumerated above, materially contributes to a relatively high maintenance cost.

It is accordingly an object of the present invention to provide a simplified helicopter rotor head and rotor control in which substantially all of the moving parts are enclosed in a liquid tight housing or body thereby permitting operation of such parts in a lubricant bath.

A further object of the invention is the provision of a helicopter rotor head and rotor control incorporating relatively simple and novel means for providing collective and cyclic switch control of the rotor blades.

A still further object of the invention is the provision of a helicopter rotor head and rotor control including means providing for auto-rotation in the event of power failure.

Another object of the invention is the provision of a helicopter rotor head and rotor control in which substantially all moving parts are enclosed within a fluid tight housing to permit operation thereof in a lubricant bath and in which friction surfaces exteriorly of the housing are lubricated by lubricant from within the housing.

A still further object of the invention is the provision of a helicopter rotor head and rotor control which may be conveniently and economically manufactured from readily available materials and which will provide collective and cyclic pitch control for any desired number of rotor blades.

Another object of the invention is the provision of a helicopter rotor head and rotor control utilizing fluid pressure means for providing collective and cyclic pitch control of the rotor blades and in which automatically operable means is provided for permitting auto-rotation of the head in the event of fluid pressure failure.

Another object of the invention is the provision of a helicopter rotor head and rotor control incorporating manual means for controlling the collective pitch of the rotor blades in the event of power control system failure.

A further object of the invention is the provision of a helicopter rotor head and rotor control providing for automatic lubrication of all moving parts and also serving to protect the moving parts from dirt or other foreign material and for preventing freezing during inclement weather.

Another object of the invention is the provision of a helicopter rotor head and rotor control incorporating a novel joint or coupling between the shank of a rotor blade and a rotor shaft projecting from the body or housing of the rotor head.

A further object of the invention is the provision of a coupling or joint for the shank of a helicopter rotor blade which permits all normal and required movement of the blade with relation to the supporting shaft and which serves to damp undesirable vibration of the blade and to provide suitable lubrication for the wearing surfaces.

Figure 2:
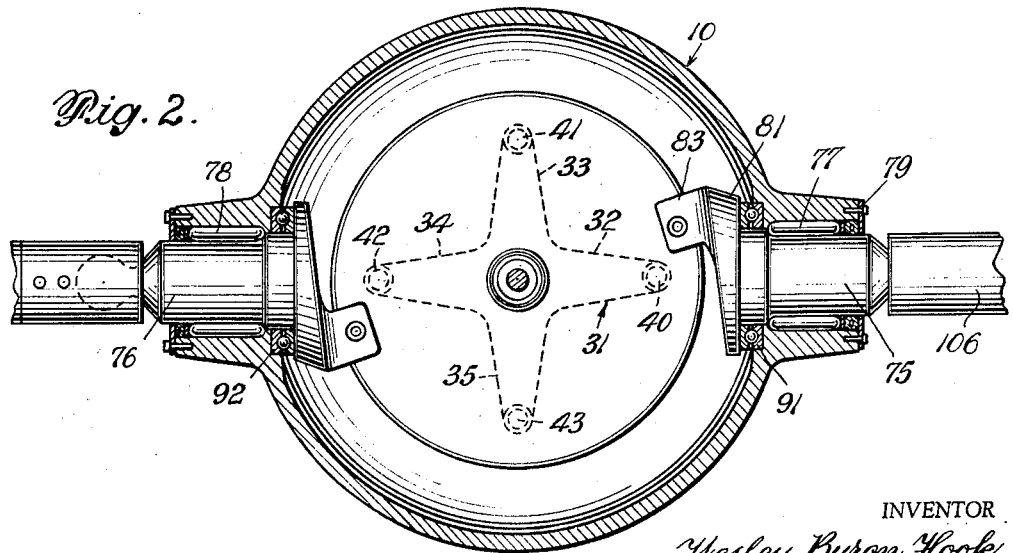
Figure 3:
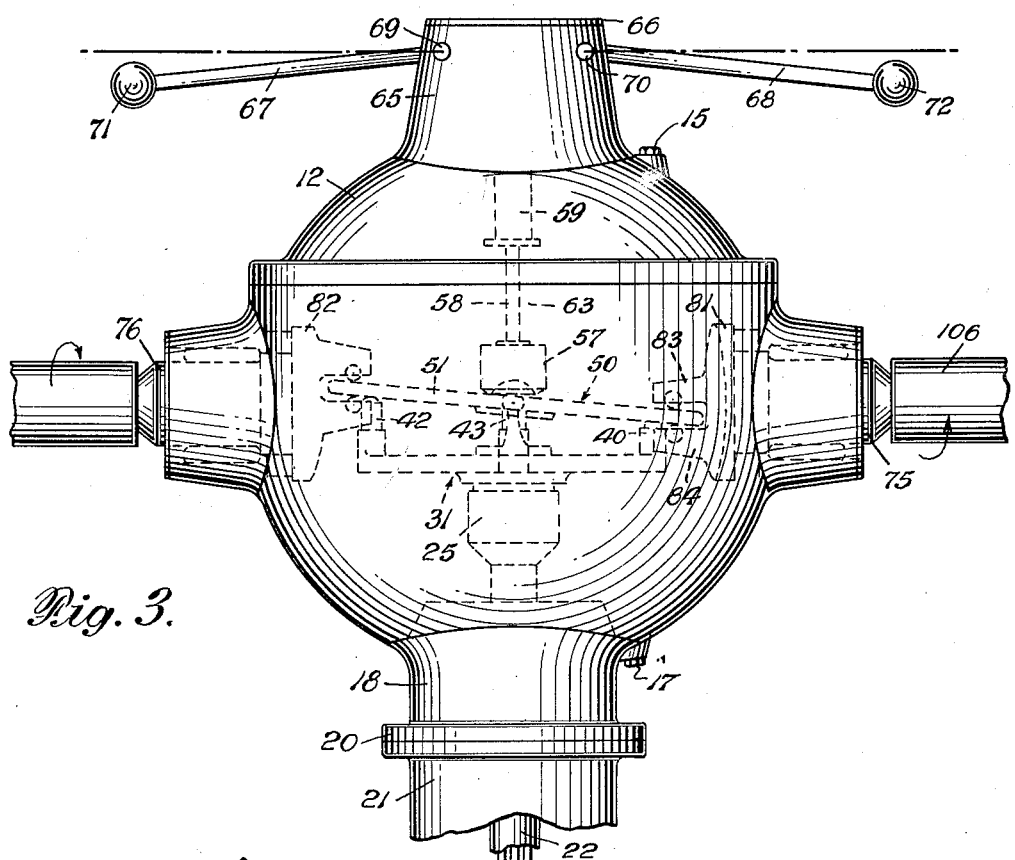
Figure 4:
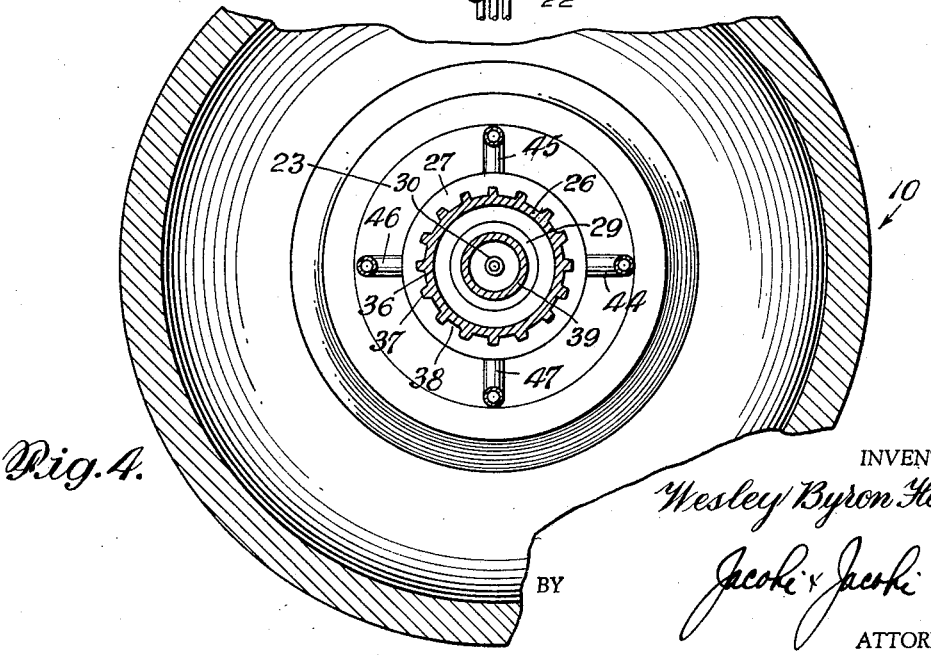
Figure 5:
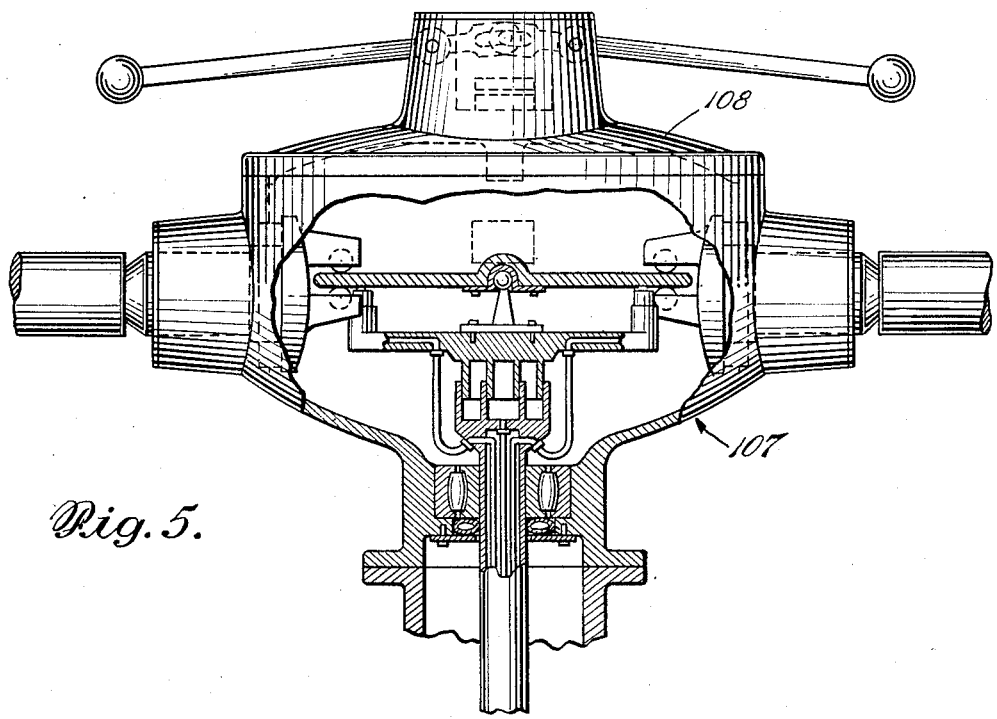
Figure 6:
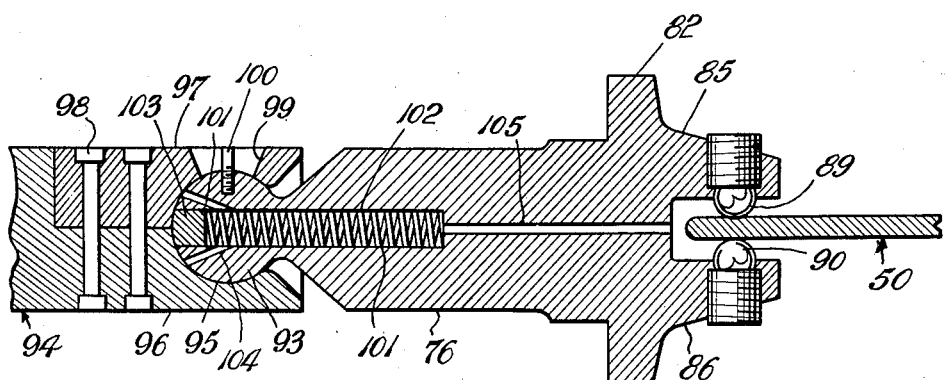
Figure 7:
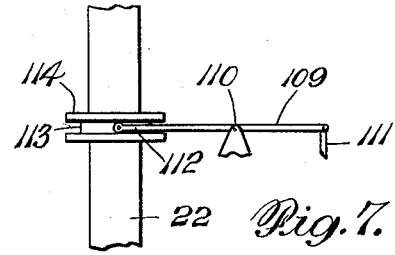

Further objects and advantages of the invention will be apparent from the following description taken in conjunction with the accompanying drawing wherein:

Fig. 1 is a longitudinal sectional view of a helicopter rotor head and rotor control constructed in accordance with this invention;

Fig. 2 a transverse sectional view taken substantially on the line 2—2 of Fig. 1;

Fig. 3 an elevational view of the rotor head shown in Fig. 1 and with the swash plate in inclined position, as shown in dotted lines to adjust the cyclic pitch of the blades;

Fig. 4 a fragmentary sectional view taken substantially on the line 4—4 of Fig. 1 and showing the manner of preventing relative rotation between the rotor blade pitch control mechanism and the supporting structure;

Fig. 5 an elevational view with parts broken away and in section for greater clarity and showing a helicopter rotor head and rotor control constructed in accordance with this invention and further showing a slightly modified form of housing or body;

Fig. 6 a sectional view showing the coupling between the rotor blade shaft and the shank of a rotor blade; and Fig. 7 a fragmentary elevational view showing a manual control means for controlling the collective pitch of the rotor blades in the event of power control system failure.

With continued reference to the drawing, there is shown a helicopter rotor head and rotor control constructed in accordance with this invention and which may well include a hollow body or housing 10 which may be made up of a lower section 11 and a cover section 12. The hollow body 10 is generally spherical in configuration and the cover portion 12 may be secured to the lower portion 11 by screw threaded or other suitable means 13 and the cover portion 12 may be provided with a lubricant filler opening 14 closed by a suitable plug 15 and the lower portion 10 may be provided with a lubricant drain opening 16 closed by a suitable plug 17. The lower portion 11 of the body 10 may be provided with a depending tubular neck 18 terminating in an annular flange 19 which may be secured in any suitable manner to an annular flange 20 at the upper end of a tubular supporting and drive shaft 21. The drive shaft 21 may be mounted in the aircraft in any suitable manner for rotation and may be connected in any desired way to a power source for driving the same.

Disposed within the hollow shaft 21 and the neck 18 of the body 10 is a hollow vertical column 22 which projects inwardly of the hollow body 10 and there may be provided a suitable anti-friction bearing 23 fixed to the body 10 and engaging the wall of the column 22 in order to maintain such column in co-axial relationship to the hollow body 10. There may also be provided a suitable oil seal 24 to prevent leakage of lubricant from within the hollow body 10 downwardly through the hollow shaft 21. The upper end of the column 22 terminates in an enlarged cylindrical portion 25 in the upper surface of which is formed an upwardly opening annular recess 26 having an outer wall 27 and divided from an inner upwardly opening cylindrical recess 28 by a cylindrical wall 29. The inner cylindrical recess 28 communicates with a source of fluid pressure through a suitable conduit 30 extending downwardly within the hollow column 22.

A spider 31 having four diametrically disposed arms 32, 33, 34 and 35 is provided with a downwardly extending annular skirt 36 which is slidably received in the annular recess 26 in the enlarged portion 25 at the upper end of column 22. The outer surface of skirt 36 is provided with splines 37 which mesh with splines 38 on the inner surface of the cylindrical wall 27 of the annular recess 26 and consequently, the spider 31 and skirt 36 may move upwardly and downwardly within the annular recess 26, but is prevented from rotation relative to the column 22 by meshing engagement of the splines 37 and 38. Inwardly of the skirt 36 and integral with the spider 31 there is provided a downwardly extending hollow plunger 39 which is received in the cylindrical recess 28 and slidably engages the inner surface of the cylindrical wall 29. Consequently, upon the introduction of fluid pressure to the cylindrical recess 28, the spider 31 will be moved upwardly, due to the pressure exerted against the plunger 39 and upon reduction of such pressure the spider 31 will move downwardly in a manner to be later described.

Upwardly extending fluid pressure operated jacks 40, 41, 42 and 43 are mounted on the outer ends of arms 32, 33, 34 and 35 respectively of the spider 31 and these jacks are connected through suitable conduits 44, 45 46 and 47 leading downwardly through the hollow column 22 to a source of fluid pressure. Also provided on the upper surface of the spider 31 centrally thereof, is a pedestal 48 which is provided on the upper end with a spherical bearing 49.

A circular swash plate 50 is disposed in a substantially horizontal position above the spider 31 with the lower surface 51 of the plate 50 engaging the jacks 40, 41, 42 and 43 and centrally of the swash plate 50 there is provided a spherical recess 52 which serves to receive the spherical bearing 49 on the upper end of pedestal 48 and the plate 50 is retained in position on the spherical bearing 49 by a retaining plate 53 secured to the swash plate 50 in any suitable manner, such as by screw threaded fastening means 54. This mounting of the swash plate 50 on the spherical bearing 49 permits rocking movement of the swash plate 50 in a manner to be later described.

The swash plate 50 is provided centrally thereof with an upwardly extending centrally located hemispherical boss 55 and the boss 55 is received in and engages the surface of a hemispherical recess 56 provided in a thrust bearing 57. The thrust bearing 57 is supported by a rod 58 slidably mounted in a guide sleeve 59 depending from the cover portion 12 of the body 10 and the rod 58 projects outwardly of the cover portion 12 through a stuffing box 60 provided with a bland nut 61 which serves to prevent leakage of lubricant from within the body 10. A washer 62 is slidably received on the rod 58 and engages the lower end of the guide sleeve 59 and disposed between the washer 62 and the upper surface of the thrust bearing 57 is a compression spring 63 which serves to retain the thrust bearing 57 in firm engagement with the hemispherical boss 55 on the swash plate 50. The upper end of the rod 58 terminates in an outwardly opening recess 64 provided by a cylindrical projection 65 on the cover portion 12 of the body 10 and the recess 64 may be closed by a suitable cover plate 66 secured to the projection 65 in any suitable manner. Pivotally mounted in the projection 65 are diametrically disposed outwardly extending lever arms 67 and 68 which may be mounted on pivot pins 69 and 70 and provided on the outer ends of lever arms 67 and 68 are fly-weights 71 and 72 respectively. The inner ends of lever arms 67 and 68 are provided with slots 73 which serve to pivotally and slidably receive a pin 74 fixed to the upper end of rod 58.

While the rotor head of this invention may be utilized with any desired number of rotor blades, for purposes of illustration, there is shown a two-blade rotor and rotatably mounted in the sidewall of the hollow body 10 are radially disposed rotor blade shafts 75 and 76. Suitable anti-friction bearings 77 and 78 may be provided for rotatably mounting the shafts 75 and 76 respectively in the wall of the body 10 and also suitable oil seal means 79 and 80 may be provided for preventing leakage of lubricant from the interior of the body 10. Crank disks 81 and 82 are provided on the inner ends of rotor shafts 75 and 76 and crank disk 81 is provided with spaced inwardly extending eccentrically disposed lugs 83 and 84, while the crank disk 82 is provided with spaced inwardly extending eccentrically disposed lugs 85 and 86. The swash plate 50 is received between the lugs 83 and 84 and between the lugs 85 and 86, as clearly shown in Fig. 1 and the lugs 83 and 84 are provided with adjustable anti-friction bearings 87 and 88 engaging the upper and lower surfaces of the swash plate 50, while the lugs 85 and 86 are provided with anti-friction bearings 89 and 90 also engaging the upper and lower surfaces of the swash plate 50. Disposed between the crank plate 81 and the adjacent wall of the body 10 is an anti-friction thrust bearing 91 and disposed between the crank plate 82 and the adjacent wall of the body 10 is an anti-friction thrust bearing 92. As best shown in Figs. 1 and 6, the outer end of rotor shaft 76 terminates in a spherical head 93 and the inner end of the rotor blade shank 94 is provided with a spherical socket 95 receiving the spherical head 93. A portion of the spherical socket 95 may be conveniently formed in an integral extension 96 of the rotor blade shank 94, while the remainder of the socket 95 may be formed in a detachable cap 97 secured to the shank 94 in any suitable manner, as by screw threaded fastening means 98. A slot 99 is provided in the cap 97 communicating with the sperical socket 95 and a radially extending pin 100 is fixed in the spherical head 93 of the shaft 76 and is received in the slot 99. The pin 100 engaging the walls of the slot 99 serves to prevent relative rotation between the rotor blade shank 94 and the shaft 76, but permits angular movement of the shank 94 with relation to the shaft 76 to the extent permitted by the length of the slot 99.

An axial bore 101 is provided in the spherical head 93 and shaft 76 and disposed in the bore 101 is a compression spring 102 which engages a friction damping member 103 slidably disposed in the bore 101 and engaging the surface of the spherical socket 95. Lubricating passages 104 communicate with the surface of the spherical head 93 and with the bore 101 and furthermore, the bore 101 communicates through a passage 105 with the interior of the hollow body 10, in such a manner, that lubricant will flow from the interior of body 10 through the passage 105, the bore 101 and the passages 104 to the surface of the spherical head 93 thereby providing suitable lubrication between the spherical head 93 and the wall of the spherical socket 95. The friction damping member 103 frictionally engaging the wall of the spherical socket 95 under the action of compression spring 102 serves to damp out unwanted vibrations of the rotor blade and also provide for a smooth angular movement of the rotor blade and blade shank 94 with relation to the rotor blade shaft 76.

While the specific structure of the coupling between the rotor blade shank 94 and the rotor blade shaft 76 is described, it is to be understood, that a similar structure is utilized for coupling the rotor blade shank 106 to the rotor blade shaft 75 and likewise, if additional blades are utilized, a similar coupling means will be provided.

The structure shown in Fig. 5 of the drawing is substantially identical with that above described, but in this modified form of the invention, the hollow body or housing 107, rather than being substantially spherical in shape, is more in the nature of a flat cylindrical hub and a substantially flat cover 108 may be provided for covering the same to provide a fluid tight enclosure for containing lubricant therein. The structure and operation of the blade mounting and control mechanism is substantially the same as that described above.

In operation, the collective pitch of the blades may be controlled by moving the spider 31 up or down by means of the introduction of fluid pressure to the cylindrical recess 28 in the enlarged portion 25 at the upper end of column 22 and as will be seen, engagement of the upper and lower surfaces of the swash plate 50 with the bearings 87 and 88 on the lugs 83 and 84 of crank disk 81 and by engagement with the bearings 89 and 90 on the lugs 85 and 86 of crank plate 82, will serve to rotate the rotor blade shafts 75 and 76 in opposite directions thereby varying the pitch of each blade an equal amount, but in the opposite direction. This serves to control the lift of the rotor during ascent or descent of the aircraft and with the swash plate in a horizontal position as shown in Fig. 1, the adjusted pitch of each blade will be maintained throughout the entire circle of revolution. When it is desired to adjust the cyclic pitch of the rotor blades for forward movement of the aircraft, it is only necessary to, for instance, lower the jack 40 on the outer end of the arm 32 of the spider 31 and raise the jack 42 on the outer end of arm 34 while the jacks 41 and 43 remain stationary thereby tilting the swash plate 50 to the position shown in dotted lines in Fig. 3. With the plate maintained in this position and upon rotation of the body 10, the pitch of the blades will be continuously varied as the bearings in the lugs of the crank plates 81 and 82 follow the surfaces of the swash plate 50 during rotation relative thereto. Obviously, the degree of cyclic pitch may be varied by varying the positions of the jacks engaging the lower surface of the swash plate 50, and any desired condition of adjustment may be conveniently obtained.

During rotation of the body 10, the fly-weights 71 and 72 will tend to move outwardly thereby exerting a downward pressure on the rod 58 and through the thrust bearing 57 on the upper surface of the swash plate 50 and in the event of fluid pressure failure which will cause a reduction of pressure in cylindrical recess 28, this downward force will result in moving the swash plate 50 and spider 31 downwardly and since the failure of fluid pressure will result in the jacks 40, 41, 42 and 43 moving to lowermost position, the swash plate 50 will move into a horizontal position and the downward movement thereof will result in providing a negative pitch for the blades which will thereby provide for auto-rotation of the blades and rotor head and permit the descent of the aircraft, even though no motor power may be available.

Since a descent by means of auto-rotation and in the absence of motive power requires a suitable adjustment of the blade pitch upon approaching the ground, there may be provided manual means for controlling the collective pitch of the blades in the event of power system control failure and with reference to Fig. 7, such manual control means may conveniently take the form of a lever arm 109 pivotally mounted at 110 and connected at one end thereof to a suitable control linkage 111. The opposite end of the lever arm 109 may be provided with a fork 112 received in an annular groove 113 in a collar 114 fixed to the column 22 and upon operation of the lever arm 109, the column 22 may be moved upwardly or downwardly through the bearing 23 in the body 10 which will result in moving the spider 31 and swash plate 50 upwardly and downwardly to vary the collective pitch of the blades. This permits slowing the descent of the aircraft upon approaching the ground and provides a means for effecting a reasonably soft landing, even though motive power for rotating the blades is not available.

As will be seen from the above, substantially all of the moving parts of the rotor head and rotor control of this invention are enclosed within the hollow body 10 and are continuously lubricated by a lubricant bath contained therein and furthermore, the enclosure of such parts within a housing protects the same from dirt or other foreign material and also prevents the collection of moisture which will freeze during inclement weather thereby preventing proper operation of the parts. While the rotor head and rotor control of this invention has been described in connection with a two-blade rotor, it is, of course, to be understood, that the same may be utilized with any number of blades by providing the proper additional parts, but the basic structure and manner of operation will, of course, be the same as for a two-blade rotor as fully described above. Also, as described above, suitable lubricating means for the couplings between the rotor shafts and the rotor blade shanks has been provided and consequently, maintenance of the device is reduced to a minimum, since it is only necessary to maintain a proper level of lubricant within the hollow body 10 to provide for proper lubrication of all of the parts associated with the rotor head and rotor control. While fluid pressure jacks and control means have been disclosed and described, it is, of course, to be understood that mechanical control means may likewise be utilized, although fluid pressure means is preferable.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A helicopter rotor head and rotor control comprising a substantially spherical hollow body, a substantially vertical column extending upwardly within said body, means mounting said body for rotation, means for moving said column upwardly and downwardly, a spider slidably and non-rotatably mounted on the upper end of said column within said body, fluid pressure means for moving said spider upwardly and downwardly, said spider having four diametrically disposed arms extending in a substantially horizontal plane, a vertically movable fluid pressure operated jack mounted adjacent the outer end of each arm, a pedestal mounted centrally of said spider, a spherical bearing on the upper end of said pedestal, a swash plate having a centrally disposed spherical recess receiving said spherical bearing with said jacks engaging the lower surface of said plate, a centrally disposed hemispherical boss on the upper surface of said swash plate, a thrust bearing having a hemispherical recess receiving said boss, a rod slidably mounted in the top wall of said body and terminating exteriorly thereof, said rod being in axial alignment with said column and fixed at its lower end to said thrust bearing, a pair of diametrically disposed lever arms pivotally mounted on the top wall of said body, the inner ends of said lever arms being pivotally and slidably connected to the upper end of said rod and fly-weights on the outer ends of said lever arms, whereby upon pivotal movement of said lever arms, said rod will move vertically, compression spring means for holding said thrust bearing in engagement with said boss, a plurality of substantially horizontal rotor blade shafts rotatably mounted in the sidewall of said body, a crank disc on the inner end of each shaft, spaced inwardly extending eccentrically disposed lugs on each disk, the outer edge of said swash plate being disposed between said lugs and opposed bearings on said lugs engaging the upper and lower surfaces of said swash plate and coupling means on the outer end of each shaft for coupling the shanks of the rotor blade thereto, said body being liquid tight whereby all elements within said body may operate in a lubricant bath.

2. A helicopter rotor head and rotor control comprising a substantially spherical hollow body, a substantially vertical column extending upwardly within said body, means mounting said body for rotation, means for moving said column upwardly and downwardly, a spider slidably and non-rotatably mounted in the upper end of said column within said body, means for moving said spider upwardly and downwardly, said spider having four diametrically disposed arms extending in a substantially horizontal plane, a vertically movable jack mounted adjacent the outer end of each arm, a pedestal mounted centrally of said spider, a spherical bearing on the upper end of said pedestal, a swash plate having a centrally disposed spherical recess receiving said spherical bearing with said jacks engaging the lower surface of said plate, a centrally disposed hemispherical boss on the supper surface of said swash plate, a thrust bearing having a hemispherical recess receiving said boss, a rod slidably mounted in the top wall of said body and terminating exteriorly thereof, said rod being in axial alignment with said column and fixed at its lower end to said thrust bearing, a pair of diametrically disposed lever arms pivotally mounted on the top wall of said body, the inner ends of said lever arms being pivotally and slidably connected to the upper end of said rod and fly-weights on the outer ends of said lever arms, whereby upon pivotal movement of said lever arms said rod will move vertically, compression spring means for holding said thrust bearing in engagement with said boss, a plurality of substantially horizontal rotor blade shafts rotatably mounted in the side wall of said body, a crank disk on the inner end of each shaft, spaced inwardly extending eccentrically disposed lugs on each disk, the outer edge of said swash plate being disposed between said lugs and opposed bearings on said lugs engaging the upper and lower surfaces of said swash plate and coupling means on the outer end of each shaft for coupling the shank of a rotor blade thereto, said body being liquid tight whereby all elements within said body may operate in a lubricant bath.

3. A helicopter rotor head and rotor control comprising a hollow body, a substantially vertical column extending upwardly within said body, means mounting said body for rotation, means for moving said column upwardly and downwardly, a spider slidably and non-rotatably mounted on the upper end of said column within said body, means for moving said spider upwardly and downwardly, said spider having radially disposed arms extending in a substantially horizontal plane, a vertically movable jack mounted adjacent the outer end of each arm, a pedestal mounted centrally of said spider, a spherical bearing on the upper end of said pedestal, a swash plate having a centrally disposed spherical recess receiving said spherical bearing with said jacks engaging the lower surface of said plate, a centrally disposed hemispherical boss on the upper surface of said swash plate, a thrust bearing having a hemispherical recess receiving said boss, a rod slidably mounted in the top wall of said body and terminating exteriorly thereof, said rod being in axial alignment with said column and fixed at its lower end to said thrust bearing, a pair of diametrically disposed lever arms pivotally mounted on the top wall of said body, the inner ends of said lever arms being pivotally and slidably connected to the upper end of said rod and fly-weights on the outer ends of said lever arms, whereby upon pivotal movement of said lever arms said rod will move vertically, compression spring means for holding said thrust bearing in engagement with said boss, a plurality of substantially horizontal rotor blade shafts rotatably mounted in the sidewall of said body, a crank disk on the inner end of said shaft, spaced inwardly extending eccentrically disposed lugs on each disk, the outer edge of said swash plate being disposed between said lugs and opposed bearings on said lugs engaging the upper and lower surfaces of said swash plate and coupling means on the outer end of each shaft for coupling the shank of a rotor blade thereto, said body being liquid tight whereby all elements within said body may operate in a lubricant bath.

4. A helicopter rotor head and rotor control comprising a hollow body, a substantially vertical column extending upwardly within said body, means mounting said body for rotation, means for moving said column upwardly and downwardly, a spider slidably and non-rotatably mounted on the upper end of said column within said body, means for moving said spider upwardly and downwardly, said spider having radially disposed arms extending in a substantially horizontal plane, a vertically movable jack mounted adjacent the outer end of each arm, a pedestal mounted centrally of said spider, a spherical bearing on the upper end of said pedestal, a swash plate having a centrally disposed spherical recess receiving said spherical bearing with said jacks engaging the lower surface of said plate, a centrally disposed hemispherical boss on the upper surface of said swash plate, a thrust bearing having a hemispherical recess receiving said boss, a rod slidably mounted in the top wall of said body and terminating exteriorly thereof, said rod being in axial alignment with said column and fixed at its lower end to said thrust bearing, a pair of diametrically disposed lever arms pivotally mounted on said body, the inner ends of said lever arms being pivotally and slidably connected to the upper end of said rod and fly-weights on the outer ends of said lever arms, whereby upon pivotal movement of said lever arms said rod will move vertically, resilient means for holding said thrust bearing in engagement with said boss, a plurality of substantially horizontal rotor blade shafts rotatably mounted in the wall of said body, a crank disk on the inner end of each shaft, spaced inwardly extending eccentrically disposed lugs on each disk, the outer edge of said swash plate being disposed between said lugs and opposed bearings on said lugs engaging the upper and lower surfaces of said swash plate and coupling means on the outer end of each shaft for coupling the shank of a rotor blade thereto, said body being liquid tight whereby all elements within said body may operate in a lubricant bath.

5. A helicopter rotor head and rotor control comprising a hollow body, a substantially vertical column extending upwardly within said body, means mounting said body for rotation, means for moving said column upwardly and downwardly, a spider slidably and non-rotatably mounted on the upper end of said column within said body, means for moving said spider upwardly and downwardly, said spider having radially disposed arms extending in a substantially horizontal plane, a vertically movable jack mounted adjacent the outer end of each arm, a pedestal mounted centrally of said spider, a spherical bearing on the upper end of said pedestal, a swash plate having a centrally disposed spherical recess receiving said spherical bearing with said jacks engaging the lower surface of said plate, a centrally disposed hemispherical boss on the upper surface of said swash plate, a thrust bearing having a hemispherical recess receiving said boss, a rod slidably mounted in the top wall of said body and terminating exteriorly thereof, said rod being in axial alignment with said column and fixed at its lower end to said thrust bearing, a pair of diametrically disposed lever arms pivotally mounted on said body, the inner ends of said lever arms being pivotally and slidably connected to the upper end of said rod and fly-weights on the outer end of said lever arms, whereby pivotal movement of said lever arms said rod will move vertically, resilient means for holding said thrust bearing in engagement with said boss, a plurality of substantially horizontal rotor blade shafts rotatably mounted in the wall of said body, a crank disk on the inner end of each shaft, spaced inwardly extending lugs on each crank, the outer edge of said swash plate being disposed between said lugs and opposed bearings on said lugs engaging the upper and lower surfaces of said swash plate and coupling means on the outer end of each shaft for coupling the shank of a rotor blade thereto, said body being liquid tight whereby all elements within said body may operate in a lubricant bath.

6. A helicopter rotor head and rotor control comprising a hollow body, a substantially vertical column extending upwardly within said body, means mounting said body for rotation, means for moving said column upwardly and downwardly, a spider slidably and non-rotatably mounted on the upper end of said column within said body, means for moving said spider upwardly and downwardly, said spider having radially disposed arms extending in a substantially horizontal plane, a vertically movable jack mounted adjacent the outer end of each arm, a pedestal mounted centrally of said spider, a spherical bearing on the upper end of said pedestal, a swash plate having a centrally disposed spherical recess receiving said spherical bearing with said jacks engaging the lower surface of said plate, a centrally disposed hemispherical boss on the upper surface of said swash plate, a thrust bearing having a hemispherical recess receiving said boss, a rod slidably mounted in the top wall of said body and terminating exteriorly thereof, said rod being in axial alignment with said column and fixed at its lower end to said thrust bearing, a pair of diametrically disposed lever arms pivotally mounted on said body, the inner ends of said lever arms being pivotally and slidably connected to the upper end of said rod and fly-weights on the outer ends of said lever arms, whereby upon pivotal movement of said lever arms said rod will move vertically, resilient means for holding said thrust bearing in engagement with said boss, a plurality of substantially horizontal rotor blade shafts rotatably mounted in the wall of said body, a crank on the inner end of each shaft, spaced bearings on each crank, said bearings engaging the upper and lower surfaces of said swash plate and coupling means on the outer end of each shaft for coupling the shank of a rotor blade thereto, said body being liquid tight whereby all elements within said body may operate in a lubricant bath.

7. A helicopter rotor head and rotor control comprising a hollow body, a substantially vertical column extending upwardly within said body, means mounting said body for rotation, means for moving said column upwardly and downwardly, a spider slidably and non-rotatably mounted on the upper end of said column within said body, means for moving said spider upwardly and downwardly, said spider having radially disposed arms extending in a substantially horizontal plane, a vertically movable jack mounted adjacent the outer end of each arm, a pedestal mounted centrally of each spider, a spherical bearing on the upper end of said pedestal, a swash plate having a centrally disposed spherical recess receiving said spherical bearing with said jacks engaging the lower surface of said plate, a centrally disposed hemispherical boss on the upper surface of said swash plate, a thrust bearing having a hemispherical recess receiving said boss, a rod slidably mounted in the top wall of said body and terminating exteriorly thereof, said rod being in axial alignment with said column and fixed at its lower end to said thrust bearing, a pair of diametrically disposed lever arms pivotally mounted on said body, the inner ends of said lever arms being pivotally and slidably connected to the upper end of said rod and flyweights on the outer ends of said lever arms, whereby upon pivotal movement of said lever arms said rod will move vertically, resilient means for holding said thrust bearing and in engagement with said boss, a plurality of substantially horizontal rotor blade shafts rotatably mounted in the wall of said body, a crank on the inner end of each shaft, means on each crank engaging the upper and lower surfaces of said swash plate and coupling means on the outer end of each shaft for coupling the shank of a rotor blade thereto, said body being liquid tight whereby all elements within said body may operate in a lubricant bath.

8. A helicopter rotor head and rotor control comprising a hollow body, a substantially vertical column extending upwardly within said body, means mounting said body for rotation, a spider slidably and non-rotatably mounted on the upper end of said column within said body, means for moving said spider upwardly and downwardly, said spider having radially disposed arms extending in a substantially horizontal plane, a vertically movable jack mounted adjacent the outer end of each arm, a pedestal mounted centrally of said spider, a spherical bearing on the upper end of said pedestal, a swash plate having a centrally disposed spherical recess receiving said spherical bearing with said jacks engaging the lower surface of said plate, a centrally disposed hemispherical boss on the upper surface of said swash plate, a thrust bearing having a hemispherical recess receiving said boss, a rod slidably mounted in the top wall of said body and terminating exteriorly thereof, said rod being in axial alignment with said column and fixed at its lower end said thrust bearing, a pair of diametrically disposed lever arms pivotally mounted on said body, the inner ends of said lever arms being pivotally and slidably connected to the upper end of said rod and fly-weights on the outer ends of said arms, whereby upon pivotal movement of said lever arms said rod will move vertically, resilient means for holding said thrust bearing in engagement with said boss, a plurality of substantially horizontal rotor blade shafts rotatably mounted in the wall of said body, a crank on the inner end of each shaft, means on each crank engaging the upper and lower surfaces of said swash plate and coupling means on the outer end of each shaft for coupling a rotor blade thereto, said body being liquid tight whereby all elements within said body may operate in a lubricant bath.

9. A helicopter rotor head and rotor control comprising a hollow body, a substantially vertical column extending upwardly within said body, means mounting said body for rotation, a spider slidably and non-rotatably mounted on the upper end of said column within said body, means for moving said spider upwardly and downwardly, said spider having radially disposed arms extending in a substantially horizontal plane, a vertically movable jack mounted adjacent the outer end of each arm, a pedestal mounted centrally of said spider, a bearing on the upper end of said pedestal, a swash plate having a centrally disposed recess receiving said bearing with said jacks engaging the lower surface of said plate, a centrally disposed boss on the upper surface of said swash plate, a thrust bearing having a recesss receiving said boss, a rod slidably mounted in the top wall of said body and terminating exteriorly thereof, said rod being in axial alignment with said column and fixed at its lower end to said thrust bearing, a pair of diametrically disposed lever arms pivotally mounted on said body, the inner ends of said lever arms being pivotally and slidably connected to the upper end of said rod and fly-weights on the outer ends of said lever arms, whereby upon pivotal movement of said lever arms said rod will move vertically, resilient means for holding said thrust bearing in engagement with said boss, a plurality of substantially horizontal rotor blade shafts rotatably mounted in the wall of said body, a crank on the inner end of each shaft, means on each crank engaging the upper and lower surfaces of said swash plate and coupling means on the outer end of each shaft for coupling the shank of a rotor blade thereto, said body being liquid tight whereby all elements within said body may operate in a lubricant bath.

10. A helicopter rotor head and rotor control comprising a hollow body, a substantially vertical column extending upwardly within said body, means mounting said body for rotation, a spider slidably and non-rotatably mounted on the upper end of said column within said body, means for moving said spider upwardly and downwardly, said spider having radially disposed arms extending in a substantially horizontal plane, a vertically movable jack mounted adjacent the outer end of each arm, a pedestal mounted centrally of said spider, a bearing on the upper end of said pedestal, a swash plate having a centrally disposed recess receiving said bearing with said jacks engaging the lower surface of said plate, a centrally disposed boss on the upper surface of said swash plate, a thrust bearing having a recess receiving said boss, a rod slidably mounted in said body, said rod being in axial alignment with said column and fixed at its lower end to said thrust bearing, a pair of diametrically disposed lever arms pivotally mounted on said body, the inner ends of said lever arms being pivotally and slidably connected to the upper end of said rod and fly-weights on the outer ends of said lever arms, whereby upon pivotal movement of said lever arms, said rod will move vertically, resilient means for holding said thrust bearing in engagement with said boss, a plurality of substantially horizontal rotor blade shafts rotatably mounted in the wall of said body, a crank on the inner end of each shaft, means on each crank engaging the upper and lower surfaces of said swash plate and coupling means on the outer end of each shaft for coupling the shaft of a rotor blade thereto, said body being liquid tight whereby all elements within said body may operate in a lubricant bath.

11. A helicopter rotor head and rotor control comprising a hollow body, a substantially vertical column extending upwardly within said body, means mounting said body for rotation, a spider slidably and non-rotatably mounted on the upper end of said column within said body, means for moving said spider upwardly and downwardly, said spider having radially disposed arms extending in a substantially horizontal plane, a vertically movable jack mounted adjacent the outer end of each arm, a pedestal mounted centrally of said spider, a bearing on the upper end of said pedestal, a swash plate having a centrally disposed recess receiving said bearing with said jacks engaging the lower surface of said plate, a thrust bearing engaging said plate centrally thereof, a rod slidably mounted in said body, said rod being in axial alignment with said column and fixed at its lower end to said thrust bearing, a pair of diametrically disposed lever arms pivotally mounted on said body, the inner ends of said lever arms being pivotally and slidably connected to the upper end of said rod and fly-weights on the outer ends of said lever arms, whereby upon pivotal movement of said lever arms said rod will move vertically, resilient means for holding said thrust bearing in engagement with said boss, a plurality of substantially horizontal rotor blade shafts rotatably mounted in the wall of said body, a crank on the inner end of each shaft, means on each crank engaging the upper and lower surfaces of said swash plate and coupling means on the outer end of each shaft for coupling the shank of a rotor blade thereto, said body being liquid tight whereby all elements within said body may operate in a lubricant bath.

12. A helicopter rotor head and rotor control comprising a hollow body, a substantially vertical column extending upwardly within said body, means mounting said body for rotation, a spider slidably and non-rotatably mounted on the upper end of said column within said body, means for moving said spider upwardly and downwardly, said spider having radially disposed arms extending in a substantially horizontal plane, a vertically movable jack mounted adjacent the outer end of each arm, a pedestal mounted centrally of said spider, a bearing on the upper end of said pedestal, a swash plate mounted on said bearing with said jacks engaging the lower surface of said plate, a thrust bearing engaging said plate centrally thereof, a rod slidably mounted in said body, said rod being in axial alignment with said column and fixed at its lower end to said thrust bearing, a pair of diametrically disposed lever arms pivotally mounted on said body, the inner ends of said lever arms being pivotally and slidably connected to the upper end of said rod and fly-weights on the outer ends of said lever arms, whereby upon pivotal movement of said lever arms said rod will move vertically, resilient means for holding said thrust bearing in engagement with said boss, a plurality of substantially horizontal rotor blade shafts rotatably mounted in the wall of said body, a crank on the inner end of each shaft, means on each crank engaging the upper and lower surfaces of said swash plate and coupling means on the outer end of each shaft for coupling the shank of a rotor blade thereto, said body being liquid tight whereby all elements within said body may operate in a lubricant bath.

13. A helicopter rotor head and rotor control comprising a hollow body, a substantially vertical column extending upwardly within said body, means mounting said body for rotation, a spider slidably and non-rotatably mounted in the upper end of said column within said body, means for moving said spider upwardly and downwardly, said spider having radially disposed arms extending in a substantially horizontal plane, a vertically movable jack mounted adjacent the outer end of each arm, a pedestal mounted centrally of said spider, a bearing on the upper end of said pedestal, a swash plate mounted on said bearing with said jacks engaging the lower surface of said plate, a thrust bearing engaging said plate centrally thereof, a pair of diametrically disposed lever arms pivotally mounted on said body, the inner ends of said lever arms being connected to said thrust bearing and fly-weights on the outer ends of said lever arms, whereby upon pivotal movement of said lever arms said thrust bearing will move vertically, means for holding said thrust bearing in engagement with said plate, a plurality of substantially horizontal rotor blade shafts rotatably mounted in the wall of said body, a crank on the inner end of each shaft, means on each crank engaging the upper and lower surfaces of said swash plate and coupling means on the outer end of each shaft for coupling the shank of a rotor blade thereto, said body being liquid tight whereby all elements within said body may operate in a lubricant bath.

14. A helicopter rotor head and rotor control comprising a hollow body, a substantially vertical column extending upwardly within said body, means mounting said body for rotation, a spider slidably and non-rotatably mounted on the upper end of said column within said body, means for moving said spider upwardly and downwardly, said spider having radially disposed arms extending in a substantially horizontal plane, a vertically movable jack mounted adjacent the outer end of each arm, a pedestal mounted centrally of said spider, a bearing on the upper end of said pedestal, a swash plate mounted on said bearing with said jacks engaging the lower surface of said plate, a thrust bearing engaging said plate centrally thereof, means connected to said thrust bearing and responsive to rotation of said body to move said thrust bearing vertically, means for holding said thrust bearing in engagement with said plate, a plurality of substantially horizontal rotor blade shafts rotatably mounted in the wall of said body, a crank on the inner end of each shaft, means on each crank engaging the upper and lower surfaces of said swash plate and coupling means on the outer end of each shaft for coupling the shank of a rotor blade thereto, said body being liquid tight whereby all elements within said body may operate in a lubricant bath.

References Cited in the file of this patent

UNITED STATES PATENTS

| | | |
|---|---|---|
| 2,023,684 | Hubbell | Dec. 10, 1935 |
| 2,394,846 | Cox | Feb. 12, 1946 |
| 2,505,759 | Faulkner | May 2, 1950 |
| 2,606,621 | Neale | Aug. 12, 1952 |